United States Patent [19]

Courtois

[11] Patent Number: 5,193,438
[45] Date of Patent: Mar. 16, 1993

[54] COFFEE MILL AND COFFEE MACHINE EQUIPPED WITH SAID MILL

[75] Inventor: Jean-Loup Courtois, Villefranche sur Saone, France

[73] Assignee: Bonnet S.A., Villefranche sur Saone, France

[21] Appl. No.: 824,360

[22] Filed: Jan. 23, 1992

[51] Int. Cl.$^5$ .............................................. A47J 31/42
[52] U.S. Cl. ................................... 99/286; 241/259.1; 99/289 R
[58] Field of Search ...................... 99/286, 279, 289 R, 99/290; 241/246, 247, 250, 259.1, 259.2

[56] References Cited

U.S. PATENT DOCUMENTS

| | | | |
|---|---|---|---|
| 1,769,776 | 7/1930 | Dryden et al. | |
| 3,076,610 | 2/1963 | Rosenfeld | 241/246 |
| 3,327,615 | 6/1967 | Swan | 99/286 |
| 4,510,853 | 4/1985 | Takagi | 99/286 |
| 4,936,515 | 6/1990 | Poag | 99/286 |

FOREIGN PATENT DOCUMENTS 3503300 8/1986 Fed. Rep. of Germany .
2074679 9/1971 France .

Primary Examiner—Robert W. Jenkins
Attorney, Agent, or Firm—Young & Thompson

[57] ABSTRACT

A coffee mill is incorporated in a coffee-making machine. At least one horizontal grinding unit has a casing provided with a lateral outlet which opens into a vertical discharge nozzle. The lateral outlet is located opposite to a centrifugal turbine which projects coffee powder through the lateral outlet. Provision is made opposite to lateral outlet for a vertical discharge nozzle, the bottom orifice of which opens directly above the location of a brewing receptacle and the upper portion of which has a lateral inlet ear placed opposite to the lateral outlet of the grinding unit. The discharge nozzle is provided with a deflecting inner wall which is capable of downwardly directing the coffee powder delivered by the grinding unit. The discharge nozzle is also removably mounted and may thus be readily cleaned.

8 Claims, 4 Drawing Sheets

COFFEE MILL AND COFFEE MACHINE EQUIPPED WITH SAID MILL

BACKGROUND OF THE INVENTION

1. Field of the Invention

The present invention relates to coffee mills and to coffee-making machines for professional use. The machines are equipped with said mills and the lower portion of each mill is provided with a station for pouring the coffee powder into a brewing receptacle.

2. Description of the Prior Art

Coffee mills of this type are so designed as to be capable of delivering at the start of each operation the dose of coffee powder which is necessary for making a quantity of coffee-brew corresponding to one or a number of cups.

However, coffee mills of this type which are in current use are subject to a certain number of drawbacks.

The chief drawback lies in the fact that, by reason of their design concept, there always exists a reserve quantity consisting of one or a number of doses of coffee powder in the different parts of a mill of this type and in the ducts through which the powder is discharged. When a fresh quantity of coffee is being ground, the powder thus produced pushes the previously ground coffee into a fixed distribution cylinder and is left in the waiting state within the coffee mill until another dose of powder in turn thrusts it forward. The disadvantage of this process is that a coffee-brewing operation is carried out each time with a dose of powder which had been allowed to remain in the waiting state and not with freshly ground powder. The coffeebrew obtained is consequently not of good quality.

Moreover, taking into account the possibilities of stagnation of a certain quantity of powder within the discharge ducts and other passages, the dose of powder delivered into the coffee receptacle is inaccurate and this also impairs the quality of the coffee-brew. A further disadvantage which arises from stagnation of coffee powder within the discharge ducts and other passages is that they must consequently be cleaned periodically, thus requiring the services of a specialized technician. It should be added that the danger of clogging is particularly great when a coffee mill is provided with a distribution cylinder.

There was described in French Patent No. 2,074,679 a coffee mill in which two grades of coffee are present within the machine and in which either one grade or the other can be ground according to choice. Provision is accordingly made for two grinding units disposed along two parallel horizontal axes and for a vertical reception duct, the axis of which is located in the vertical midplane between the two grinding units. In addition, these two grinding units are driven by a single motor, preselecting means being so arranged that only one of the two grinding units is active when the motor is started-up. However, in this patent, the ground coffee is poured into a vertical feedpipe which opens onto a distribution plate, with the result that the coffee powder is thrust in the upward direction. As already mentioned, this device consequently has a disadvantage in that a coffee infusion or "brew" is made with a dose of powder which had been left in the waiting state and not with freshly ground powder.

Furthermore, when changing-over from one grinding unit to the other in order to change to a different grade of coffee, several qualities of ground coffee powder are present in the waiting condition within the feedpipe, thus making a machine of this type extremely inconvenient to use.

The object of the present invention is to overcome the various disadvantages mentioned above by producing a coffee mill so designed as to ensure that the freshly ground powder is immediately employed for the preparation of a coffee infusion dose and that, in addition, there should be no danger of stagnation of powder within the coffee mill or within the discharge duct.

SUMMARY OF THE INVENTION

The present invention relates to a coffee mill incorporated in a coffee-making machine of the type comprising at least one grinding unit having a horizontal axis and a casing provided with a lateral outlet which opens into a vertical discharge nozzle, wherein said lateral outlet is located opposite to a centrifugal turbine which projects the ground coffee through said lateral outlet and wherein provision is made opposite to said outlet for a vertical discharge nozzle, the bottom orifice of which opens directly above the location of a brewing receptacle and the upper portion of which has a lateral inlet ear placed opposite to the lateral outlet of the grinding unit, the discharge nozzle being provided with a deflecting inner wall which is capable of downwardly directing the coffee powder delivered by the grinding unit.

Preferably, the centrifugal turbine is rigidly fixed to the rotary grinding ring.

Moreover, in order to permit very easy cleaning of the coffee powder discharge nozzle, said nozzle is removably mounted by being simply engaged in a vertical housing which is formed in the frame of said grinding unit and from which said nozzle can be withdrawn simply by sliding in the upward direction, a suitable bearing member being intended to immobilize said discharge nozzle in its position of use in which its inlet ear is located exactly opposite to the outlet of the coffee-grinding unit.

In an advantageous embodiment, provision is made for two separate and distinct grinding units which are placed on each side of the coffee powder discharge nozzle and which are connected to two supply reservoirs containing different varieties of coffee, the discharge nozzle being provided with two inlet ears similarly arranged and disposed respectively opposite to the outlet of each coffee-grinding unit.

In accordance with yet another distinctive feature of the coffee mill provided by the invention, one of the grinding rings of the coffee mill is capable of displacement in translational motion with respect to the other grinding ring under the action of an electric drive motor of the so-called "stepping" type operated in dependence on a control unit which is capable of delivering pulses having a frequency equal to the frequency of rotation of said motor in order that each pulse should produce one revolution of said drive motor. This accordingly permits easy and highly accurate adjustment of the degree of fineness of the grind.

The present invention is also concerned with coffee-making machines for professional use, a machine of this type being equipped with a coffee mill.

DETAILED DESCRIPTION OF THE INVENTION

Figure 1:
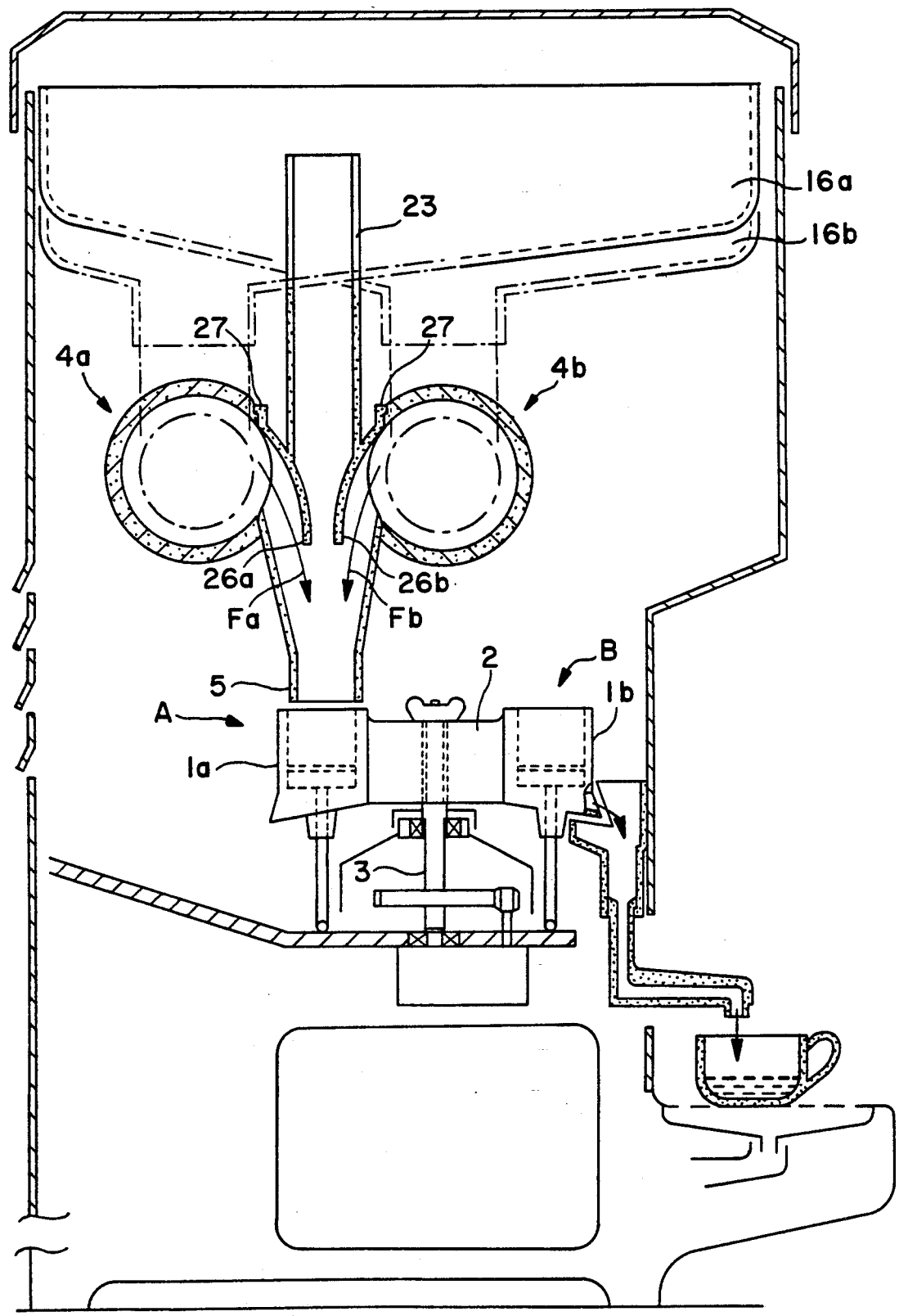
FIG. 1 is a vertical sectional view of a coffee-making machine equipped with a coffee mill in accordance with the invention.

FIG. 1 illustrates a coffee-making machine equipped with a coffee mill in accordance with the invention. A filling station A is provided in the lower portion of said machine. A coffee-brewing receptacle 1a placed at the filling-station location is intended to receive a predetermined dose of coffee powder. In the example illustrated, this receptacle 1a is integral with a support 2 carried by a central rotary shaft 3. Said support 2 is adapted to carry a second receptacle 1b which is similar to the receptacle 1a but which is located in a diametrically opposite position. Thus, each receptacle can be moved in turn to a position opposite to the filling station A, then opposite to a second station B for making an infusion of coffee, this being the case of the second vessel 1b shown in FIG. 1.

The coffee mill in accordance with the invention is located in the upper portion of the machine under consideration, above the filling station A. In the example shown in FIG. 1, the coffee mill is not equipped with one grinding unit alone but with an assembly comprising two separate and distinct grinding units 4a and 4b. These two grinding units 4a and 4b are placed on each side of a vertical nozzle 5 having the intended function of discharging freshly ground coffee powder. The nozzle 5 as shown in detail in FIG. 2 is constituted by a part of molded plastic, preferably of polysulfone resin in order to facilitate sliding of the coffee powder and to avoid any risk of stagnation of the powder on the nozzle walls.

It is worthy of note that the bottom orifice of the above-mentioned discharge nozzles is located exactly above the receptacle 1a placed at the filling station location A. Thus the coffee powder falls directly into this receptacle 1a in a vertical direction and not slantwise as in the majority of present-day coffee machines. In point of fact, vertical falling of the coffee powder permits the formation of a uniformly distributed heap and thus facilitates subsequent compacting of the powder while also making it possible to obtain an infusion having a uniform concentration.

As shown in the drawings, the axis X-Y of the grinding rings of each individual grinding unit 4a and 4b is placed horizontally. The casing of each grinding unit 4a and 4b secured to a frame 8 which is intended to serve as a support for both grinding units and for the discharge nozzle 5 (as shown in FIG. 2). Said frame 8 (not shown in FIGS. 1 and 3) is in turn secured to the body structure of the coffee machine.

Figure 2:
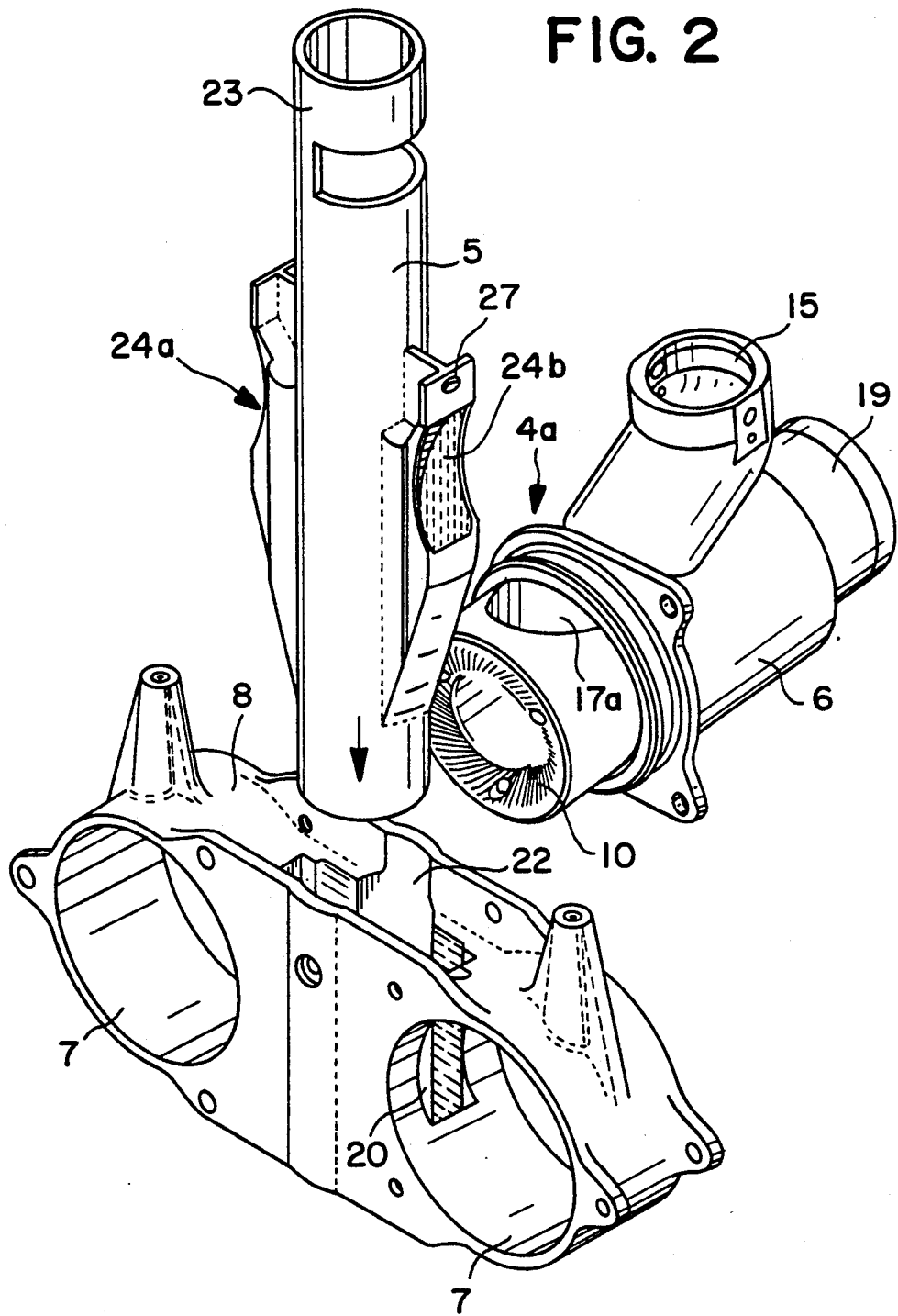
FIG. 2 is a view in perspective showing some of the essential parts of the coffee mill prior to assembly of said parts.
Figure 4:
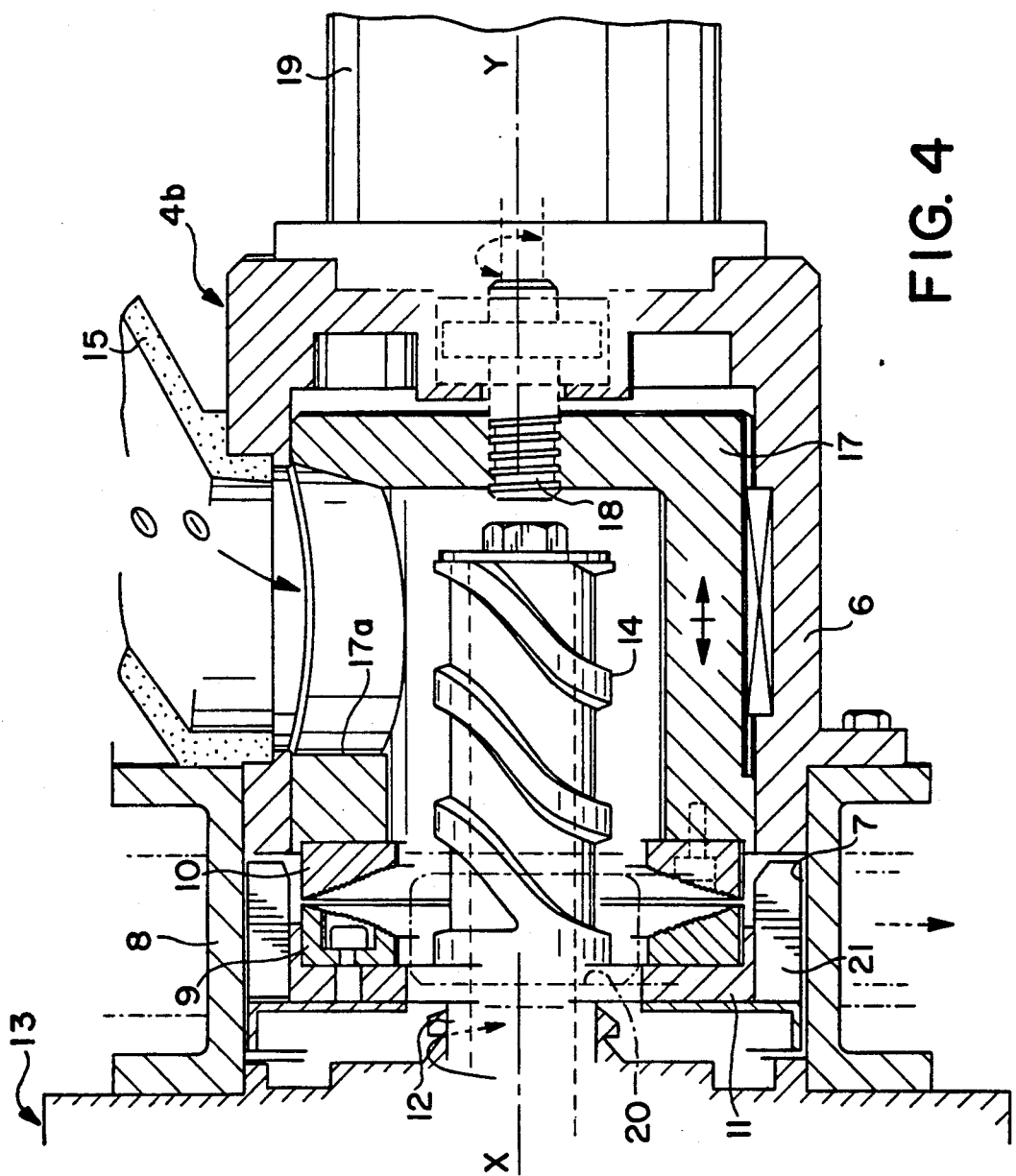
FIG. 4 is an axial sectional view of an individual coffee-grinding unit.

As is apparent from FIGS. 2 and 4, said frame 8 has two cavities 7 and each cavity, constitutes the grinding chamber of one of the grinding units 4a or 4b. This chamber contains two grinding units placed in oppositely-facing relation, as shown in FIG. 4, one ring 9 being rotatably mounted while the other ring 10 is stationary. The grinding ring 9 if fixed on a rotor 11 carried by the rotary shaft 12 of a drive motor 13 which is secured to the frame 8. Said rotary shaft carries at the free end thereof an endless screw 14 which is intended to convey the coffee beans into the space located between the two grinding ring 9 and 10. Said endless screw 14 is located opposite to a feed spout 15 which serves to connect each grinding unit 4a and 4b to a separate reservoir 16a or 16b, these two reservoirs 16a and 16b being intended to contain different varieties of coffee.

A control device (not illustrated) causes a predetermined quantity of coffee beans to pass to the grinding unit 4a or 4b which is in service. Thus, by starting up one of these two units according to the user's choice, an infusion can be obtained from either of the two varieties of coffee provided in the supply reservoirs 16a or 16b.

The stationary grinding ring 10, as seen in FIG. 4, is rigidly fixed to a hollow support 17 constituted by a piston slidably mounted within the casing 6 and provided with a top opening 17a for the admission of coffee beans. This support can be displaced in translational motion by means of a rotary screw 18 driven by an electric motor 19. This capability accordingly makes it possible to modify the position of the grinding ring 10 with respect to the rotating ring 9 in order to adjust the degree of fineness of the grind.

It is worthy of note that the drive motor 19 considered in the present instance is a motor of a very special type, namely an electric motor of the so-called "stepping" type operated in dependence on a control unit which is capable of delivering pulses having a frequency equal to the frequency of rotation of the motor 19. Said control unit may be provided with a microprocessor and is also capable of reversing the direction of rotation of the motor 19. Provision is made in addition, and in association with said control unit, for a power supply as well as a sequencer which permits appropriate routing of the pulses to the windings of the motor 19.

Thus each pulse delivered by said control unit produces one revolution of the motor 19 in the requisite direction and therefore an accurately determined but very limited axial displacement of the stationary grinding ring 10 with respect to the rotary grinding ring 9. In consequence, even an unskilled person is capable of adjusting the fineness of the grind produced by the grinding unit. It should be added that the degree of accuracy obtained by the invention could not possibly be achieved with other regulating systems, even with complex mechanical or electromechanical systems.

With a view to guarding against any danger of forcible application of the grinding rings 9 and 10 against each other and consequent damage, it is possible to set a zero point on the control unit. In order to carry out this adjustment, the grinding rings 9 and 10 are moved by hand into contact with each other before initializing the control unit. Provision is accordingly made in the control unit for a bidirectional counter which will prohibit any motion of the motor 19 which would tend to produce a relative movement of approach of the grinding ring 9 and 10 beyond the zero point. Moreover, this control unit can also be employed for automated adjustment of the clearance between the grinding rings 9 and 10.

A lateral outlet 20 is provided at mid-height in the wall of each grinding chamber 7, one of these outlet 20 being shown in chain-dotted lines in FIG. 4. This outlet 20 is clearly directed towards the discharge nozzle 5 which is placed between the two grinding units 4a and 4b. Opposite to the position of said outlet 20, the rotor 11 carries a series of fins 21 constituting a centrifugal turbine. The function of this turbine is to carry out centrifugal discharge of the coffee powder, thus guarding against any danger of stagnation within the corresponding grinding unit 4a or 4b.

As will be apparent from FIG. 2, the frame 8 has a vertical housing 22 which is intended to receive the discharge nozzle 5 and has a bottom opening as well as an opening at the top. The discharge nozzle 5 is removably mounted within the frame 8 simply by engagement of its lower end within the housing 22. However, said nozzles can be readily removed in a simple upward sliding movement by gripping in one hand the upper end 23 which projects in the upper portion of the coffee machine.

Figure 3:
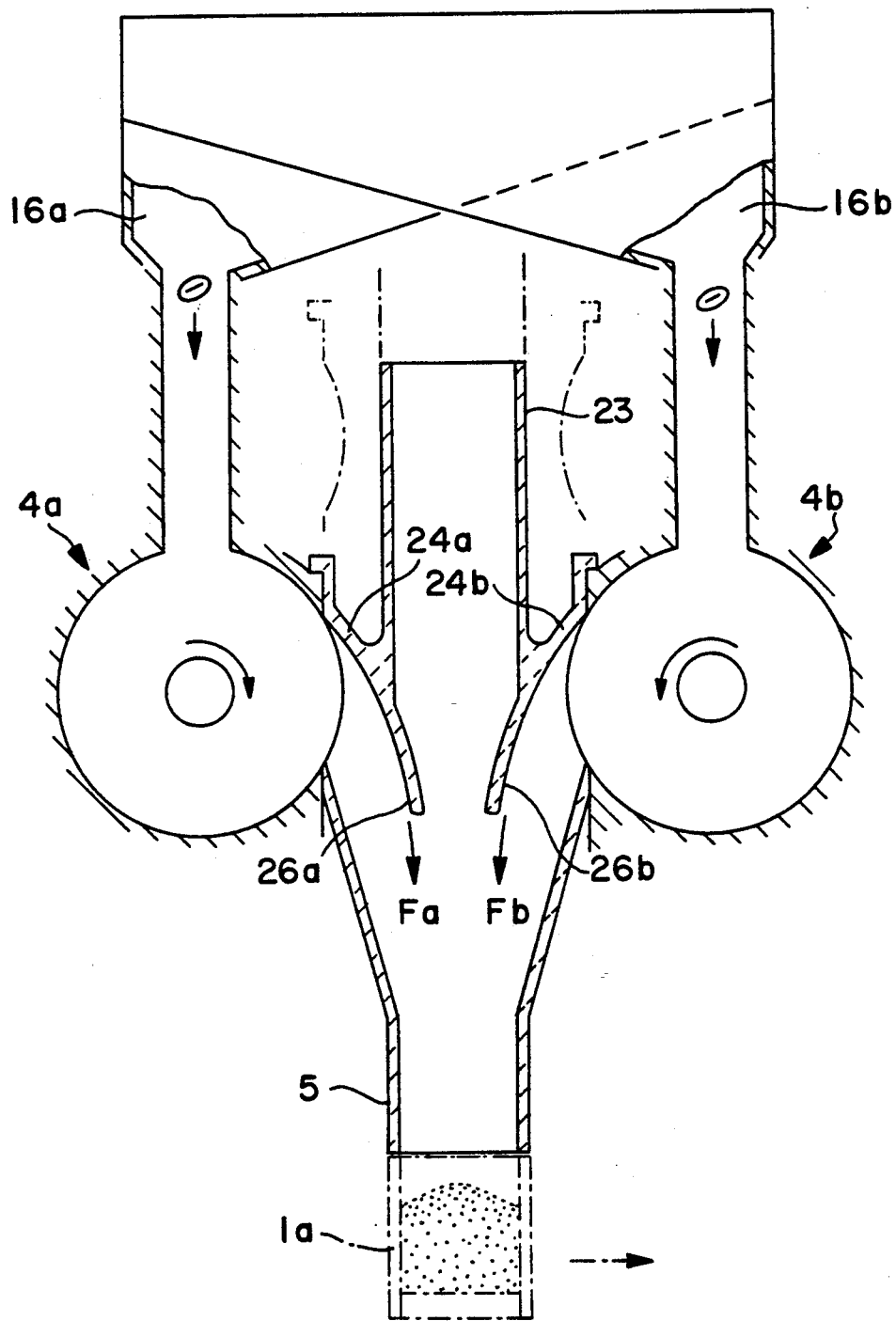
FIG. 3 is a vertical sectional view of the discharge nozzle provided in this coffee mill as shown in the position of use.

The nozzle 5 is provided with two inlet ears 24a and 24b located in diametrically opposite positions. Said inlet ear 24a and 24b have a profile such that each ear is applied against the outlet 20 of the corresponding grinding unit 4a and 4b when the discharge nozzle 5 is in position. As shown in FIG. 3 the nozzle 5 has a deflecting inner wall 26a or 26b located opposite to each inlet ear. Thus, the coffee powder delivered by the grinding unit 4a or 4b on which the corresponding inlet ear 24a or 24b is fixed can be directed downwards by said deflecting inner wall 26a or 26b in the direction of the arrows Fa or Fb (as shown in FIG. 1). To this end, each inner wall 26a or 26d has a curved profile, the concavity of which is directed towards the corresponding grinding unit 4a or 4b.

By virtue of the arrangement thus provided, the dose of powder ground in either one grinding unit 4a or with the unit 4b passes immediately into the nozzle 5 and is discharged directly into the receptacle la as shown in FIGS. 1 and 3. Under these conditions, there is therefore no risk of stagnation of coffee powder or of any of its attendant disadvantages.

In the case under consideration, each infusion of coffee is therefore carried out with a dose of freshly ground powder. This infusion makes it possible to obtain excellent taste and quality of the beverage thus obtained. Moreover, the quantity of powder employed corresponds each time and very exactly to the predetermined dose since there is no danger of stagnation of even the smallest quantity of coffee powder on its discharge path. For the same reason, there is therefore no possibility of loss of a certain quantity of powder on the discharge path or any risk of entrainment of a quantity of coffee powder which may previously have remained stagnant on said path.

Moreover, the discharge nozzles can very readily be removed even by an unskilled person since it is only necessary to withdraw it from the frame 8 simply by sliding it under the action of a pulling force exerted on the upper end. The nozzles may therefore be completely cleaned before being put back in its position of use.

In this connection, it should be observed that special means are provided for ensuring accurate positioning of the discharge nozzle 5 when it is put back in place in order that the inlet ears 24a and 24b should come into very accurate register with the outlets 20 of each grinding unit 4a and 4b. These positioning means, as shown in FIG. 2 can consist very simply of a bearing member 27 which is provided at the top of each inlet ear 24a or 24b and which is capable of bearing against the corresponding edge of the housing 22 formed in the frame 8. However, other fastening means could be provided instead of the bearing members 27, such as resilient snap-action engagement means.

It is in any case readily apparent that the coffee mill in accordance with the invention is not limited to the example which has been described in the foregoing specification and which has been given solely by way of example. Thus, it would be wholly feasible to provide a single grinding unit 4a or 4b instead of two, in which case the discharge nozzle 5 would have only one inlet ear 24a or 24b placed opposite to the service opening of this grinding unit 4a or 4b. Conversely, however, it would be possible to have more than two individual grinding units 4a or 4b by providing a corresponding number of inlet ears 24a and 24b on the discharge nozzles.

As already mentioned, the present invention is also concerned with a coffee-making machine which is equipped with a mill of the type described in the foregoing specification and which can be either of the type shown in FIG. 1 or of any other type.

What is claimed is:

1. A coffee mill incorporated in a coffee-making machine of the type comprising:
    at least one grinding unit having a horizontal axis and a casing provided with a lateral outlet;
    a vertical discharge nozzle, wherein said lateral outlet is located;
    a centrifugal turbine which projects coffee powder through said lateral outlet and into said vertical discharge nozzle;
    a brewing receptacle into which a bottom orifice of the discharge nozzle opens directly;
    said discharge nozzle having an upper portion on which at least one lateral inlet ear is placed opposite to the lateral outlet of the grinding unit;
    said discharge nozzle also being provided with a deflecting inner wall which is capable of downwardly directing the coffee powder delivered by the grinding unit.

2. A coffee mill according to claim 1, wherein the centrifugal turbine is rigidly fixed to a rotary grinding ring.

3. A coffee mill according to claim 1, wherein the discharge nozzle is removably mounted by being simply engaged in a vertical feed spout which is formed in the casing of said grinding unit and from which said discharge nozzle can be withdrawn simply by sliding in the upward direction.

4. A coffee mill according to claim 1, wherein two separate and distinct grinding units are placed on each side of the discharge nozzle and are connected to two supply reservoirs containing different varieties of coffee, said discharge nozzle being provided with two inlet ears similarly arranged and disposed respectively opposite to the lateral outlet of each grinding unit.

5. A coffee mill according to claim 4, wherein casings of the two separate grinding units are fixed in a frame provided with a central vertical feed spout which has an opening both at the bottom and at the top of said frame and within which the discharge nozzle is placed.

6. A coffee mill according to claim 1, wherein one grinding ring is capable of displacement in translational motion with respect to another grinding ring under the action of an electric drive motor of the "stepping" type which is operated in dependence on a control unit that is capable of delivering pulses having a frequency equal to a frequency of rotation of said motor in order that each pulse should produce one revolution of said drive motor.

7. A coffee mill according to claim 6, wherein the control unit functions is to control the drive motor for adjusting the degree of fineness of the coffee powder and is capable of prohibiting any motion of the drive motor which would tend to cause a relative movement of approach of the grinding rings beyond a zero point, said zero point being stored in memory at a time of starting up the coffee mill.

8. A coffee mill according to claim 1, further comprising:
a bearing means for immobilizing the discharge nozzle in a position of use during which an inlet ear on the discharge nozzle is located opposite to the lateral outlet of the grinding unit.

* * * * *